United States Patent Office 3,076,846
Patented Feb. 5, 1963

3,076,846
COUPLING BY HYDROXYL RADICALS AND NEW TRIAMINO COMPOUNDS
William Robert McClellan, Kennett Square, Pa., assignor to E. I. du Pont de Nemours and Company, Wilmington, Del., a corporation of Delaware
No Drawing. Filed Feb. 8, 1957, Ser. No. 638,936
11 Claims. (Cl. 260—583)

This invention relates to an improved process for the production of solutions of hydroxyl free-radicals, and relates particularly to the preparation and use of solutions of hydroxyl free-radicals for increasing the functionality of organic compounds, especially by coupling reactions.

This application is a continuation-in-part of my application Serial No. 470,130, filed November 19, 1954, now abandoned.

Free radicals are generally extremely active and have found application in organic reactions, e.g., as catalysts in addition polymerization. The existence of free hydroxyl-radicals, i.e., the ·OH radical, has been established in recent years as shown by Stein and Weiss, Nature 166, 1104–5 (1950). The hydroxyl radicals are particularly useful to bring about coupling reactions of organic compounds to form polyfunctional compounds. One of these is the reaction of hydroxyl radicals with aliphatic organic compounds containing functional groups such as cyano, carboxyl, carbonyl, carbonamide, amino, and hydroxyl groups in acidic aqueous reaction media to effect an oxidative coupling of two molecules of the aliphatic compound as illustrated in Equation 1, (1) $2CH_3CH_2COOH + 2 \cdot OH \rightarrow$
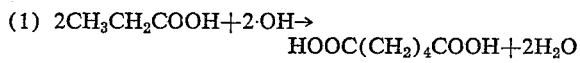
$HOOC(CH_2)_4COOH + 2H_2O$ wherein ·OH represents the hydroxyl free-radical. This process has been described in U.S. 2,700,051. Reaction of hydroxyl radicals with aromatic compounds is described by Loebl et al., J. Chem. Soc., 1949, 2074; Boyland et al., ibid., 1953, 2966; Stein et al., ibid., 1951, 3265, 3275, wherein, among others, carboxyl and hydroxyl aromatics are converted to compounds of higher functionality.

When an ethylenically unsaturated aliphatic compound, particularly a conjugated diene, is also present, the product obtained is neither a high polymer of the addition polymerizable compound, nor the coupled organic product as in the above equation. Instead it is generally a four unit chain formed from a unit of the functional compound (which is generally aliphatic), two units of the unsaturated compound, and another unit of the functional compound, linked together in that order. A specific example of this type of reaction is the formation of a glycol of the structure, (2) $HOC(CH_3)_2CH_2—(CH_2—CH=CH—CH_2)—$
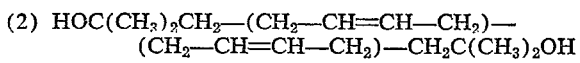
$(CH_2—CH=CH—CH_2)—CH_2C(CH_3)_2OH$ when tert-butyl alcohol is reacted with hydroxyl radicals in the presence of butadiene, as disclosed subsequently in Example V. Such coupling occurs with a variety of other functional aliphatic compounds, e.g., carbonyl, cyano, carboxyl, carbonamide and amino compounds, making it feasible to produce corresponding compounds with other functional end groups, as when cyclohexanone, acetone, acetaldehyde, propionitrile, glutaric acid, methyl acetate, or cyclohexylamine, are substituted for the alcohol. The general process for the production of this type of longer chain polyfunctional compounds has been described in U.S. Patents 2,757,192 and 2,757,210.

These reactions involving hydroxyl free-radicals provide a method of increasing the functionality and size of organic compounds to form polyfunctional compounds having functional groups at the ends of a carbon chain. Polyfunctional intermediates of great industrial importance can be formed in this way from simple and readily available monofunctional compounds, e.g., the method can be used to prepare diamine, glycol, and dibasic acid intermediates for linear condensation polyamides or polyesters used in textile fibers and other plastics applications. The modification of the reaction which includes an aliphatic diene in addition to the elementary functional compound produces polyfunctional compounds having longer chains containing unsaturated linkages which are available for further reactions. These are likewise useful for preparing condensation polymers, and the unsaturated linkages are then available for cross-linking reactions to reduce the thermoplasticity and solubility of the polymers by methods analogous to those employed for rubber and synthetic rubbers.

Since the reaction described provides a way of converting relatively inexpensive and readily available monofunctional compounds into valuable difunctional compounds, the commercial possibilities are excellent if the cost of the process does not offset the increment in value of the compounds. A major factor is the expense of the hydroxyl free-radicals. For the process to be commecially practical the cost of the hydroxyl radicals must be kept low, with the reaction product being obtained in high yield based on the reactants employed, and especially with respect to the reactants used in forming hydroxyl free-radicals. The process should also be such that the product can be separated readily from the reaction mixture.

Heretofore, the main methods proposed for the production of hydroxyl free-radicals have been either the action of ultraviolet light on hydrogen peroxide or of selected oxidizable metal ions on hydrogen peroxide. In the first method relatively large amounts of light are required (a photon for each radical formed) and the reaction requires considerable time. The second, which is more feasible, requires stoichiometric amounts of oxidizable ion with hydrogen peroxide. The latter method is illustrated by Equation 3.

(3) $H_2O_2 + Fe^{++} \rightarrow \cdot OH + Fe^{+++} + OH^-$
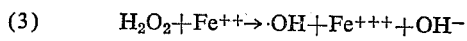

When hydroxyl free-radicals are obtained by this method, several disadvantages have been found. In the first place, this stoichiometric reaction requires large amounts of ferrous or similar readily oxidizable ion. The oxidized form has little economic value. In some instances, e.g., when hydroxyaryl compounds are present, ferric ion reduces the yield of desired products through oxidation. Furthermore, the oxidized metal ions are present in such large amounts that there is considerable difficulty in the separation of the organic compounds from the inorganic materials. For example, ferric ion, under acidic conditions, requires considerable acid and water to give a solution, or homogeneous reaction conditions, in which the organic compound is prepared. Isolation of the relatively small amount of desired coupled product from the large amount of water and inorganic materials is complicated. Furthermore, the yields of organic poly-functional compound should be higher than are obtainable in this way for successful commercialization of the general process.

Accordingly, it is an object of the present invention to provide an improved process for preparing solutions of hydroxyl free-radicals suitable for use in increasing the functionality of organic compounds. Another object is to provide an improved process for increasing the functionality of organic compounds with hydroxyl free-radicals, whereby markedly improved yields are obtained and the reaction mixture is relatively free of inorganic materials. A further object is the preparation of new. acyclic triprimary triamines. Other objects of the invention will become apparent from the following description and claims.

A superior method has now been found for carrying out the reactions of hydroxyl radicals with organic compounds referred to above. The improvement comprises generating the hydroxyl free-radicals, in the presence of the organic compounds in an aqueous solution having a pH less than 7.0 and containing 1 to 100 times as much water by weight as organic compound, by reacting hydrogen peroxide with an oxidizable metal ion in the aqueous solution in a molar ratio of hydrogen peroxide to oxidizable metal ion in the range of 100:1 to 5:1 and in the presence of hydrogen and a noble metal hydrogenation catalyst. It has been found that, by this improved process, new acyclic triprimary triamines of 12–24 carbons in which each of the amino groups is attached to tertiary carbon are obtained when hydroxyl radicals are generated in the presence of a primary monoamine having the amino group attached to tertiary carbon of an alkyl radical of 4 to 8 carbon atoms.

It is surprising that this combination of hydrogen peroxide, hydrogenation catalyst, oxidizable metal ion in small amounts and hydrogen produces hydroxyl free-radicals for efficient use in organic reactions. According to chemical literature, when hydrogen peroxide is contacted with a hydrogenation catalyst such as platinum, the peroxide decomposes into water and oxygen. Hence such catalysts would be expected to impede rather than assist the formation of hydroxyl radicals.

In the following examples, which illustrates specific embodiments of the process of this invention, a small amount of noble metal hydrogenation catalyst is suspended in an aqueous medium containing the functional organic compound (e.g., tert-butyl alcohol and amine, and phenol), and a small amount of oxidizable metal salt, e.g., ferrous salt along with sufficient acid to maintain the iron in solution. The mixture may also include an ethylenically unsaturated aliphatic compound when a compound of the type illustrated in (2) above is desired. To this mixture, hydrogen gas is introduced and hydrogen peroxide is slowly added to generate hydroxyl free-radicals. The polyfunctional compound produced is isolated from the reaction mixture by customary separation and purification procedures.

*Example I*

A total of 0.3 g. of platinum oxide is suspended in a solution containing 78 g. (1.05 moles) of tert-butyl alcohol, 1.25 cc. of concentrated sulfuric acid, 2.8 g. (0.01 mole) of ferrous sulfate heptahydrate, and 70 cc. of water. Hydrogen is bubbled into this vigorously stirred reaction medium through a tube capped with fritted glass at a rate of 200 cc./min. with the simultaneous dropwise addition over a period of 1 hour and 15 minutes of a solution of 9.9 g. (0.29 mole) of hydrogen peroxide in 50 g. of water. During this time, the reaction temperature is held at 40–42° C. by means of a cooling bath. The catalyst is removed by filtration and excess sodium sulfate is then added. The organic layer that separates is removed, dried over anhydrous potassium carbonate and distilled. The white solid remaining after distilling to a pot temperature of 80° C. at 20 mm. pressure for 45 minutes is crude 2,5-dimethyl-2,5-hexanediol and amounts to 10.0 g. Based on hydrogen peroxide this corresponds to a yield of 48%. The pure glycol M.P. 86–88° C. is obtained by recrystallization from ethyl acetate.

In contrast to the above yield, only a 36% yield of this glycol is obtained when ferrous sulfate and hydrogen peroxide are used in equimolar proportions in the absense of hydrogen and metal catalyst. The latter reaction employed 27 times as much ferrous sulfate, 17 times as much sulfuric acid and 4 times as much water (based on the unit weight of hydrogen peroxide) as employed in the preceding experiment.

*Example II*

To a vigorously stirred solution of 78 g. (1.05 moles) of tert-butyl alcohol, 2 cc. of concentrated sulfuric acid, 10 g. (0.036 mole) of ferrous sulfate heptahydrate and 100 g. of water containing 0.3 g. of platinum oxide held at a temperature of 30–33° C., is added dropwise 9.9 g. (0.29 mole) of hydrogen peroxide in 50 g. of water. The addition of the hydrogen peroxide solution is carried out over a period of 2 hours and 20 minutes and during this time hydrogen is bubbled into the solution through gas dispersing sintered glass at the rate of 200 cc./min. Isolation of the glycol formed is carried out as described in Example I giving 13.6 g. of 2,5-dimethyl-2,5-hexanediol. This corresponds to a yield (based on hydrogen peroxide) of 65%.

*Example III*

A solution of 105 g. (1.44 mole) of tert-butylamine in 135 g. of water is neutralized with 40 cc. of concentrated sulfuric acid in 240 g. of water. To this solution is added 8 g. (0.03 mole) of ferrous sulfate heptahydrate in 15 g. of water and 0.5 g. of platinum oxide. This reaction medium is held at 45–48° C. while hydrogen is bubbled in at a rate of 200 cc./min. and 17 g. (0.5 mole) of hydrogen peroxide in 68 g. of water is added dropwise over a period of 3 hours and 45 minutes. The hydrogen flow is stopped for the addition of the last 5 g. of the hydrogen peroxide solution. The solution is filtered to remove the catalyst and then a 50% potassium hydroxide solution is added to bring the pH to a value of 8.0 to 8.5 and precipitate ferric hydroxide, which is then removed by filtration. The precipitate is washed with a small amount of water and then with a 110 g. of isopropyl alcohol. The washings are combined and 200 g. of solid potassium hydroxide is then added. The organic layer that separates is removed, dried and distilled. The fraction boiling at 50° C. under 5 mm. pressure is tetramethyltetramethylenediamine (2,5-dimethyl-2,5-diaminohexane). A total of 13.65 g. of this diamine with a neutral equivalent of 72.5 (theoretical value is 72) and an $n_D^{25°}$ of 1.4442 is obtained. This corresponds to a yield of 38%, based on hydrogen peroxide. The high boiling residue (9 g.) remaining in the distilling pot is a light amber liquid with a neutral equivalent of 78.5 and an $n_D^{25°}$ of 1.4780. This material is principally 12-carbon triamines containing a small amount of tetramine and higher amine products. If the higher amines are considered in the yield, the overall use of hydrogen peroxide to give amines is increased by 24%.

In contrast to the above experiment, when hydrogen peroxide and ferrous sulfate are employed in equimolar amounts in the absence of hydrogen and metal catalyst, a yield of 9% of the tetramethyltetramethylene-diamine is obtained.

*Example IV*

A solution of 28 g. (0.3 mole) of phenol, 2 cc. of concentrated sulfuric acid and 10 g. (0.036 mole) of ferrous sulfate heptahydrate in 180 cc. of water with 0.3 g. of suspended platinum oxide is held at a temperature of 48–51° C. for 1 hour and 45 minutes while hydrogen is bubbled into it through a tube capped with fritted glass at a rate of about 200 cc./min. During this period of time 9.9 g. (0.29 mole) of hydrogen peroxide in 43 g. of water is added dropwise at a uniform rate. The phenolic components of the reaction mixture are removed by continuous extraction with ether. The ether extract is dried and then the ether is removed from it by distillation. Assay of the 24.3 g. of phenolic product obtained gives 14.2 g. of unreacted phenol, 3.8 g. of catechol and 2.7 g. of hydroquinone.

In the above experiment, substantially no tarry products are obtained. In contrast to this, when larger amounts of ferrous salt are used (in the absence of a hydrogenation catalyst and hydrogen), iron in the ferric form catalyzes the oxidation of polyhydric phenols to give substantial amounts of polymeric or tarry materials.

Example V

To a vigorously stirred solution of 78 g. (1.05 moles) of tert-butyl alcohol, 2 cc. of concentrated sulfuric acid, 5 g. (0.018 mole) of ferrous sulfate heptahydrate and 80 g. of water containing 0.3 g. of platinum oxide, held at a temperature of 30–35° C., is added dropwise 7.8 g. (0.23 mole) of hydrogen peroxide in 75 g. of water. The addition of the hydrogen peroxide is carried out over a period of 1 hour and 5 minutes and during this time hydrogen and 1,3-butadiene are bubbled into the solution through separate glass dispersing tubes. The flow of hydrogen and 1,3-butadiene are at the rates of 200 cc./minute and 120 cc./minute, respectively. The catalyst is removed by filtration and excess sodium sulfate is then added. The organic layer that separates is removed. The aqueous salt layer is extracted with ether and then with benzene. The combined organic fractions are dried over anhydrous potassium carbonate and distilled. The light-colored, viscous liquid remaining after distilling to a pot temperature of 70° C. at 8 mm. pressure is crude 2,13-dimethyltetradeca-5,9-diene-2,13-diol and amounted to 17.4 g. Based on hydrogen peroxide, this corresponds to a yield of 60%. The infrared analysis of this product corresponds to that of an authentic sample of this glycol.

Example VI

A solution of 170 g. (2.3 moles) of tert-butyl alcohol, 3 cc. of concentrated sulfuric acid, 3 g. (0.01 mole) of ferrous sulfate heptahydrate, and 145 cc. of water, containing 0.5 g. of platinum oxide, is cooled to 15° C. and 22 g. (0.175 mole) of 1,1,4,4-tetrafluorobutadiene is added. This solution is vigorously stirred while hydrogen is bubbled in through sintered glass at a rate of about 200 cc./min. and 6.8 g. (0.20 mole) of hydrogen peroxide in 35 cc. of water is added dropwise over a period of 35 minutes. The reaction temperature is held at 15–18° C. The catalyst is then removed by filtration and excess sodium sulfate added. The organic extract is shaken with potassium carbonate in a separatory funnel. A considerable amount of gas forms at this stage and a yellow color develops in the organic layer. It is probable that HF splits out of some of the product at this stage. The aqueous potassium carbonate layer that forms is separated and the organic layer distilled.

In this distillation, 2.1 g. of coupled product, 1,1,4,4-tetramethyltetramethylene glycol, boiling at 78° C./0.5 mm. is obtained. This amount represents a 16% yield.

There is 11.9 g. of residue remaining after heating the distillation flask with steam under a pressure of 0.1 mm. The analytical data obtained on this product are as follows: M.W., 410, 405; F, 33.40; C, 48.79; H, 6.26.

Nuclear magnetic resonance spectra indicate the presence of four different types of fluorine, one of these being on a saturated carbon atom and the other three on unsaturated carbon atoms. Analysis of these spectra indicates that the product is a 1:2 mixture of

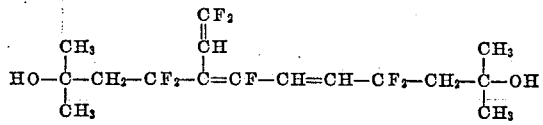

and

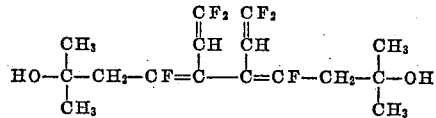

with very little, if any, of other compounds present. The amount of product obtained corresponds to a yield of 37%, based on the 1,1,4,4-tetrafluorobutadiene used.

Example VII

A solution of 15 cc. of concentrated sulfuric acid (0.53 equivalents) in 75 cc. of water is added to a solution of 35 g. (0.48 mole) of tert-butylamine until a methyl orange end point is reached. An additional 5 cc. of the acid solution is added. Three grams of hydrated ferrous sulfate in 5 cc. of water and 0.25 g. of platinum oxide is then added. The reaction mixture is held at about 35° C., and 10 cc. of 35% hydrogen peroxide solution (0.116 mole) in 9 cc. of water is added dropwise with vigorous stirring over a period of 55 minutes while hydrogen and butadiene are bubbled into the reaction mixture through separate gas dispersion tubes at rates of 200 cc./min. and 175 cc./min., respectively. The flow of hydrogen is discontinued near the end to leave the iron in the ferric state.

In the work-up of products, 50% potassium hydroxide solution is added to a pH of about 8.0. The precipitated ferric hydroxide is removed by filtration. Solid potassium hydroxide is then added until two liquid layers form and the potassium sulfate precipitated in the process is removed by filtering. After removal of the organic layer, the aqueous layer is extracted with benzene and then with ether. The combined organic fractions are dried with potassium hydroxide and the organic extracts are filtered and then distilled.

Distillation gives the following fractions:

| Fraction | Weight, g. | B P./mm. |
|---|---|---|
| 1 | 1.5 | 30°/2. |
| 2 | 0.3 | 30-110°/0.1. |
| 3 | 1.6 | 115°/0.1. |
| Residue | 1.7 | |

Fraction 1 is 2,5-dimethyl-2,5-diaminohexane, the amount obtained corresponding to an 18% yield. Analytical data obtained are: Found: Neut. eq., 72.5; $n_D^{25}$, 1.4453.

Fraction 3 is an unsaturated 12-carbon diamine, formed by the reaction of two butylamine units with one butadiene unit, which is obtained in a 14% yield.

*Analysis.*—Calcd. for

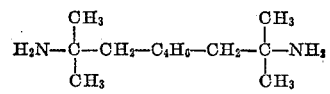

Neut. equiv., 99.2; N, 14.12; M.W., 198.4; C, 72.66; H, 13.21. Found: Neut. eq., 100.5; N, 13.83, 14.05; M.W., 235, 245; C, 71.45; H, 12.97.

The amber-colored viscous residue is a 24-carbon triamine. As such, the amount obtained represents a 16% yield.

Found: Neut. eq., 127, N, 11.17, 11.36; M.W., 560, 595; C, 71.59; H, 12.10.

Example VIII

A solution of 26.2 g. of 35% hydrogen perovide (0.27 mole) in 28 cc. of water is added dropwise over a period of 80 minutes to 41 g. of acetonitrile (1 mole), 120 cc. of water, 6 g. (0.02 mole) of hydrated ferrous sulfate, 2 cc. of concentrated sulfuric acid, and 0.3 g. of platinum oxide with rapid stirring. During this period, hydrogen is bubbled into the reaction medium through a gas dispersing tube at a rate of 250 cc./min. There is thus obtained 1.3 g. of succinonitrile, boiling point of 77° C./0.2 mm., and 1.5 g. of residue that solidifies on cooling and has a melting point of 44–45° C.

Example IX

An aqueous solution of 62 g. (0.465 mole) of 2,4,4-trimethyl-2-aminopentane (tert-octyl amine), 350 cc. of water, 14 cc. (0.25 mole) of concentrated sulfuric acid, and 6 g. (0.02 mole) of ferrous sulfate heptahydrate with 0.5 g. of finely divided platinum oxide suspended therein is vigorously stirred and held at 50° C. for a period of 80 minutes while 17.5 g. (0.18 mole) of 35% aqueous hydrogen peroxide is added dropwise. Hydrogen is bubbled into the solution through a gas dispersing tube for all excepting the last 5 minutes of this period.

The work-up of product is similar to that of Example III. After stripping off the unreacted amine and the extraction solvents, 13.5 g. of light straw-colored liquid with a neutral equivalent of 129 (calculated for excepted 16-carbon diamine is 128) is obtained. Distillation of this liquid gave the following fractions:

| Fraction | B.P./mm. | $n_D^{25}$ | Neutral Equivalent | Weight, g. |
|---|---|---|---|---|
| 1 | 89–90°/0.1 | 1.4686 | 131 | 2.63 |
| 2 | 90–93°/0.1 | 1.4704 | 127.5 | 3.56 |
| 3 | 93–94°/0.1 | 1.4733 | 128 | 2.73 |
| Residue | small amount of viscous tan liquid | | | |

*Example X*

A 22 liter flask having side creases and a bottom indentation is equipped with a high speed stirrer, a graduated dropping funnel, gas inlet tube, a thermometer and a reflux condenser. Into the flask are placed, in the order given, 6800 g. of ice, 2100 g. of tert-butylamine, a solution of 880 ml. of concentrated sulfuric acid in 1900 ml. water, 160 g. of ferrous sulfate heptahydrate, and 10 g. of platinum oxide. The air in the flask is displaced by passing a stream of nitrogen through it for 15–20 minutes and the solution heated on a steam bath at the same time. Then hydrogen is passed in through the dispersion tube for 15 minutes to reduce the platinum oxide to platinum. When the temperature rises to above 50° C., a solution of 860 ml. of 35% hydrogen peroxide diluted with 740 ml. of water is added over a period of about 1 hour. The exothermic reaction causes the temperature to rise to 85–90° C. The hydrogen stream is stopped and replaced with nitrogen before the final 100 ml. of peroxide solution is added in order to leave the iron in the ferric state for ease in subsequently removing it. The platinum catalyst is removed by filtration. The filtrates from 20 such runs and 10 similar runs half this size are combined for further processing. To the combined filtrates is added a solution of 225 lbs. of potassium hydroxide in 121 liters of water. A precipitate of iron oxide and potassium sulfate forms and is removed by filtration with the aid of a diatomaceous earth filter aid. This filtrate is extracted with one 210-lb. portion of chloroform, one 70-lb. portion and eleven 40-lb. portions. Each extraction is stirred for several minutes and then allowed to settle before the lower layer is removed. The organic extracts obtained are combined and concentrated in a large still. When the residual solution has a volume of 8 gallons, it is transferred in portions to a 36″ precision still (described in U.S. Patent 2,712,520) having a 12 liter still pot for further concentration.

After the chloroform is completely removed, the residual product is distilled into the folowing fractions under reduced pressure:

| Fraction | Boiling Point | Weight, g. | $n_D^{25}$ |
|---|---|---|---|
| A | 44° C./38 mm. to 78° C./19 mm | 64 | 1.4461 |
| B | 78–81° C./19 mm | 724 | 1.4443 |
| C | 81–93° C./19–20 mm | 722 | 1.4443 |
| D | 83–84° C./20 mm | 728 | 1.4443 |
| E | 84–85° C./19–20 mm | 694 | 1.4443 |
| F | 85° C./21 mm | 748 | 1.4442 |
| G | 84–85° C./20 mm | 644 | 1.4442 |
| H | 71–80° C./5.7–6.5 mm | 844 | 1.4450 |
| I | 65–76° C./5.6–6 0 mm | 664 | 1.4446 |
| J | 75–80° C./5.4 mm | 136 | 1.4461 |
| K | 99° C./5.0 mm. to 130° C./2.3 mm | 846 | 1.4702 |
| L | 116–128° C./1.6–2.5 mm | 1,262 | 1.4726 |

Fractions B through J amount to 5904 g. (13.0 lbs.) of 2,5-dimethyl-2,5-hexanediamine. Fractions K and L contain the two triamines, 2,5,8-trimethyl-2,5,8-nonanetriamine and 4-(1-amino-1-methylethyl)-2,6-dimethyl-2,6-heptanediamine, which are formed by the following reaction:

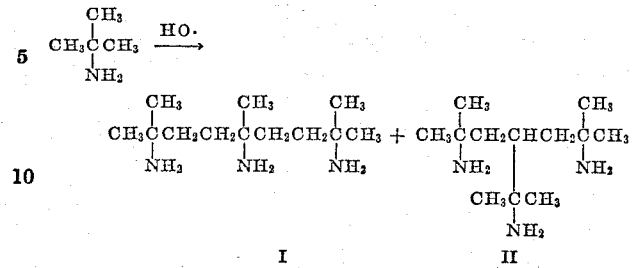

A portion of fraction L, 365 g. is fractionated through a similar still to give a cut boiling at 105.5° C./1.3 mm. and $n_D^{25}$ 1.4730 and analyses as follows:

*Analysis.*—Calcd. for $C_{12}H_{29}N_3$: C, 66.92; H, 13.57; N, 19.51. M.W., 215.4; Neut. eq., 71.8. Found: C, 66.81; H, 13.41; N, 19.10; M.W., 242; Neut. eq., 72.8.

To a boiling solution of 6 g. of picric acid in 270 ml. of water is added dropwise 1.56 g. of the triamine. When the solution is allowed to cool, a bright yellow crystalline material precipitates. It is recrystallized from hot water and melts at 235–240° C.

*Analysis.*—Calcd. for $C_{30}H_{38}N_{12}O_{21}$: C, 39.91; H, 4.24; N, 18.62. Found: C, 40.24; H, 4.41; N, 18.19.

*Example XI*

A flask similar to that of Example X except that it had a capacity of 2 1. is charged with 575 g. ice, 212 g. tert-amylamine, a solution of 74.5 ml. of conc. sulfuric acid in 160 ml. water, 13.6 g. of ferrous sulfate heptahydrate, and 2.0 g. of platinum oxide. The air in the flask is displaced with nitrogen, and hydrogen is bubbled into the solution for 20 minutes as the solution is heated to 56° C. Then, as hydrogen is bubbled into the solution, 100 ml. of 35% hydrogen peroxide diluted with 85 ml. water is added over a period of 25 minutes. The exothermic reaction causes a temperature increase to 88° C. The hydrogen stream is replaced by nitrogen as the final 10 ml. of peroxide solution is added. The platinum catalyst is removed by filtration. A solution of 41 g. of potassium hydroxide in 65 ml. water is added to the filtrate, and the resulting precipitate of iron hydroxides is removed by filtration. To the filtrate is added a solution of 325 g. of potassium hydroxide in 325 ml. water; potassium sulfate precipitates and an upper organic layer separates. The organic layer is separated after 100 ml. methylene chloride is added, and the aqueous layer is extracted with five additional 100-ml. portions of methylene chloride. The methylene chloride is distilled from the combined organic layers, along with unreacted tert-amylamine, and water is azeotropically removed with the methylene chloride. The residual liquid is fractionated through a 9-inch Vigreux column to give a diamine mixture (cut 1), a triamine mixture (cut 3), and an intermediate fraction.

| Cut | Boiling Point | Weight, g. |
|---|---|---|
| 1 | 70–85° C./4.8 mm | 26.0 |
| 2 | 76° C./1.4 mm. to 69° C./0.86 mm | 3.3 |
| 3 | 94–120° C./0.85 mm | 6.6 |

Calcd. for $C_{15}H_{35}N_3$ (triamine): C, 69.98; H, 13.70; N, 16.32; N.W., 257.5. Found for cut 3: C, 68.78; H, 13.03; N, 15.19; M.W., 264.

The triamine obtained contains 3,9-dimethyl-6-ethyl-3,6,9-undecanetriamine, 2,6,11-trimethyl-2,6,11-dodecanetriamine, and 4-(2-amino-2-methylpropyl)-2,3,6-trimethyl-2,6-octanediamine.

*Example XII*

Hydrogen is bubbled through a gas dispersing tube at a rate of 250 cc./minute into a vigorously stirred solution, held at a temperature of 35–40° C., of 100 g. of pivalic acid (0.98 mole), 90 g. of water, 105 g. of acetic acid, and 6 cc. of 1.6 M vanadyl sulfate solution (0.0096 mole), containing 0.5 g. of finely divided platinum oxide suspended therein, until the color of the solution changes from a blue to a green. The hydrogen is continued in this manner while 13 cc. of a solution of 9.9 g. (0.29 mole) of hydrogen peroxide in 50 g. of water is added over a period of 35 min. Near the end of this period the catalyst commences to settle out on the sides of the flask and the solution turns blue. The hydrogen peroxide addition is discontinued and 15 g. of acetic acid is added. This causes the catalyst to redisperse in the solution and the green color to reappear. Another 16 cc. of the hydrogen peroxide solution is added over a period of 52 min. and the solution is then heated to 65° C. for the addition over a period of 70 min. of the remaining hydrogen peroxide solution. The hydrogen addition is discontinued for the addition of the last 1 cc. of hydrogen peroxide solution in order to leave the vanadium in the tetravalent state. The catalyst is removed by filtration and the filtrate is distilled under reduced pressure. During the distillation, a blue layer commences to separate. When the blue color has entirely disappeared from the organic phase, the distillation is interrupted and the small amount of aqueous vanadyl sulfate is removed. The distillation is then continued and the solid remaining after distilling to a pot temperature of 80° C. under 8 mm. pressure is crude $\alpha,\alpha,\alpha',\alpha'$-tetramethyladipic acid and amounts to 9.4 g. Based on hydrogen peroxide, this corresponds to a yield of 32%. The pure acid with a melting point of 191–191.5° C. is obtained by recrystallization from methyl ethyl ketone. The melting point of a mixture of this acid and an authentic sample of $\alpha,\alpha,\alpha',\alpha'$-tetramethyl adipic acid prepared by a different method was the same as above.

Hydroxyl free-radicals react with organic compounds with considerable rapidity as illustrated by the examples. As shown by Stein and Weiss, Nature 166, 1104–5 (1950), hydroxyl radicals react with aromatic compounds such as benzene and substituted aryl compounds to produce phenol, diphenyl and corresponding substituted diphenyls. Hydroxyl radicals react with such aromatic compounds which are hydrocarbon except for carbonyl, carboxyl, cyano, amide, amino, or hydroxyl groups, e.g., benzaldehyde, benzoic acid, benzonitrile, benzamide, aniline, and catechol in the general procedure of Example IV. A more important reaction of hydroxyl free-radicals is with aliphatic compounds containing at least one functional group, such as the nitriles, acids, amides, amines and alcohols, whereby the size of the molecule and number of functional groups per molecule are at least doubled. This is illustrated by Equation 1 which shows the coupling of two molecules of propionic acid to produce one molecule of adipic acid. In the coupling reaction, the hydroxyl radical is employed as a reactant, as is evident from the equation.

Other acids such as butyric, isobutyric, pivalic, glutaric, as well as their lower alkyl esters, react in the same manner as the propionic acid of Equation 1. Other aliphatic compounds that undergo a similar coupling reaction include cyano compounds such as propionitrile, butyronitrile, pivalonitrile and adiponitrile; carbonamides such as propionamide; carbonyl compounds such as butyraldehyde, methyl ethyl ketone and cyclohexanone; amino compounds such as propylamine, tert-butylamine, amylamine and laurylamine; and alcohols such as tert-butyl alcohol and cyclohexanol.

As evidenced by the numerous compounds heretofore disclosed, the cyclic organic compounds in the process of this invention have no more than one cyclic group and that carbocyclic. The functional organic compounds employed in the coupling reaction have from 2–12 carbons and preferably 2–6 carbons. Preferred are monofunctional aliphatic compounds, including cycloaliphatic (alicyclic), free from open chain carbon-to-carbon unsaturation, and soluble in water to the extent of at least 0.1%, at least 0.5% being desirable and 3% or more being preferred.

When hydroxyl free-radicals are reacted with hydrogen-containing functional organic compounds of the type previously described in the presence of butadiene as an additional reactant, the product obtained has the general formula R—$(C_4H_6)$—$(C_4H_6)$—R where R is a monovalent radical corresponding to the functional organic compound employed and $C_4H_6$ is a butene unit. For the R group, any of the previously disclosed types of aldehydes or ketones (carbonyl compounds), barboxylic acids and esters, carbonamides and amines can be employed. Instead of butadiene, other polymerizable ethylenically unsaturated compounds of up to eight carbons can be used in the same way, and it is preferred that these have conjugated unsaturation, as illustrated by acrylonitrile, styrene or aliphatic dienes of 4 to 5 carbons. The preferred dienes of 4 to 5 carbons contain hydrogen and no more than four fluorine or chlorine atoms as the sole substituents. The dienes of 4 to 5 carbons, e.g., butadiene, isoprene, 2-chloro-1,3-butadiene, 1,3-cyclopentadiene, are most useful in this "additive dimerization reaction." The organic compounds which are free from carbon-to-carbon unsaturation, serve as "reactive solvents" and include such compounds as the 2-6 carbon-carbon compounds containing a functional group such as cyano, carboxyl, carbonamide, amino, carbonyl or alcohol groups.

The outstanding advantage of this invention resides in the fact that hydroxyl radicals are obtained under conditions that not only avoid the use of equivalent amounts of an oxidizable metal ion with an inorganic peroxide, but give, in general, considerably better conversion of hydrogen peroxide to hydroxyl radicals as judged by the production of the desired "dimerized," or higher, products. In the process itself there are additional advantages. The oxidizable metal ion, e.g., ferrous ion, is required in catalytic amounts, which, by itself, is of economic importance. The oxidized form of this ion is of little value; in fact, the presence of large amounts of the oxidized ion introduces complications in the isolation of the desired product. When ferrous ion and hydrogen peroxide are employed in equivalent amounts, relatively large amounts of an acid have been employed to keep the reaction acidic to avoid precipitation of the hydroxide of the oxidized ion, e.g., iron hydroxide. Hence, the desired product of that reaction is diluted with relatively large amounts of water and inorganic salts. Furthermore, for many phenolic compounds, the presence of substantial amounts of ferric ion promotes low yields of desired products as shown in the discussion following Example IV.

A further advantage of the process of this invention, in comparison with the above process, is that the simultaneous and equivalent addition at a small rate and at low temperatures of hydrogen peroxide and oxidizable metal ions is not required to obtain appreciable yields. Furthermore, the rate of the reaction of this invention can be advantageously increased by employing higher temperatures (without increasing the oxidizing power of the oxidized ion, e.g., ferric ion, at elevated temperatures).

In this invention hydroxyl radicals are generated by the action of hydrogen peroxide with catalytic amounts of an oxidizable metal ion in the presence of hydrogen and a noble metal hydrogenation catalyst. Although hydrogen peroxide is the preferred source of hydroxyl radicals, any inorganic peroxide can be employed under conditions whereby hydrogen peroxide is formed, e.g., an alkali metal peroxide under acidic conditions. The amount of peroxide employed is generally less than the weight of the organic compounds present, generally from 1 to 50% by weight of the organic compounds.

Although ferrous ion is preferred as the oxidizable metal ion in view of its availability and ability to be formed from ferric ion and hydrogen under catalytic hydrogenation conditions, vanadous, i.e., vanadium (II, III), is substantially equal in effectiveness. Other inorganic ions such as titanous, i.e., titanium (III), could be used in place of ferrous or vanadous ion, however. The amount of oxidizable inorganic ion introduced into the reaction mixture is generally less than one-fifth of the hydrogen peroxide on a molar basis. The quantity of ferrous ion is ordinarily in the range of 1 to 20 mole percent of the hydrogen peroxide to be added, however less than 1 mole percent can be employed since ferrous ion functions as a catalyst. Generally at least 1 mole percent and usually 2–12 mole percent are used since it is difficult to follow the oxidation state of the iron visually at lower concentrations. Thus when a light yellow color is imparted by ferric ion to the solution, the addition of hydrogen peroxide has been made too fast for efficient use.

The process of this invention requires the presence of hydrogen and a hydrogenation catalyst. The hydrogen is introduced as gas in the reaction mixture. Effective hydrogenation catalysts are those which do not reduce the organic compounds present nor react with any of the intermediates in the reaction system of this invention. The noble metal catalysts, i.e., palladium, platinum, iridium and osmium and their oxides are effective. It is preferred that these catalysts be free of carbonaceous material since the presence of the latter may reduce the yield of the desired products. Furthermore, other hydrogenation catalysts, such as copper chromite, pyrophoric iron, and Raney nickel, have not been found to give the improved yields obtained when noble metal catalysts are used. The amount of catalyst required is quite small, although the ratio of catalyst to organic compounds can vary within wide ranges, such as 1/1000 to 1/10.

The reaction of this invention is carried out under aqueous conditions and is preferably acidic, i.e., the pH is less than 7.0, generally below 5.0, and can be 2.0 or lower. Acidic conditions are employed to prevent precipitation of ferric salts or other oxidized metal ions. The acidity of the aqueous reactor medium does not substantially change during reaction of this invention since the hydroxyl ion generated in the hydrogen peroxide to hydroxyl radical step [see Equation 3] reacts with hydrogen ion formed in the catalytic reduction of ferric to ferrous iron by hydrogen. In the prior process in which equimolecular amounts of hydrogen peroxide and ferrous ion are employed, the pH of the reaction mixture changes unless acid is added at a rate comparable to that of the formation of hydroxyl ion.

The amount of water present should not exceed one hundred times the weight of the organic compounds present. Preferable ratios of water to organic compounds are less than 30:1 and even less than 10:1. With highly water-soluble organic compounds, the amount of water can be less than 1:1.

The reaction time is not critical but generally requires at least 15 minutes, with times of a few hours generally used. Suitable temperatures are of the order of −10 to 100° C. Room temperature is satisfactory for the process.

The reaction products are isolated by any suitable technique, e.g., by extraction, distillation, crystallization. The method selected is dependent upon the specific properties of the product obtained.

Since a wide variety of products are obtainable by the process of this invention, they are useful for many purposes. Certain of the products are useful as plasticizers or in the preparation of plasticizers. The difunctional products are especially useful as intermediates in the preparation of linear condensation polymers for textile fibers or plastic uses generally. Diamines prepared as illustrated in Example III form useful polyamides for textile fibers when reacted with dibasic carboxylic acids in accordance with the teaching of Carothers' U.S. Patent No. 2,130,523. Glycols prepared as illustrated in Examples I and II may likewise be used to prepare useful polyamides by reaction with a dinitrile as disclosed in U.S. Patent No. 2,628,218 to Magat.

The new acyclic triamines obtained by the process of this invention have the three amino groups attached to tertiary carbons, which are in turn removed from the nearest similar tertiary carbon by a chain of at least two carbons. The latter two carbons which are bonded to tertiary carbons thus mean that the primary amino groups are separated from the closest similar amino group by at least a four-carbon chain.

As shown in Examples X and XI, the new triamines include isomers. The skeletal structure of such compounds includes the two of the following types (particularly when a 4-carbon amine is employed):

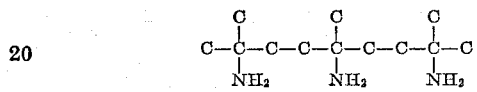

and

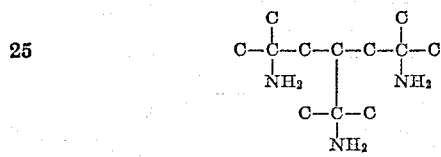

In the above representation, the unsatisfied valences of the carbons are bonded to hydrogen or lower (1-2 carbon) alkyls such that the triamine contains between 12 and 24 carbons. It is thus seen that the compounds are acyclic aliphatic hydrocarbon except for the three amino, —NH₂, groups.

The triamines of this invention are obtained by the action of hydroxyl radicals upon a primary monoamine in which the amino group is attached to tertiary carbon of an alkyl radical of from 4 to 8 carbons. The monoamines are embraced by the general formula

wherein the R groups are alkyl radicals, preferably of one to three carbons. Included are the following primary monoamines, tert-butylamine, tert-amylamine, tert-hexylamine, 3-ethyl-3-aminopentane and 2,4,4-trimethyl-2-aminopentane.

The amines are isolated readily by conversion of the salt, which is the form obtained when the reaction medium is acidic, to the free amine followed by separation of the amino products from the reaction mixture. The amines obtained when 4-5 carbon monoamines are used are soluble in water. They can be removed by salting out of the reaction system or extracted by a solvent. Purification is generally accomplished by distillation, usually at reduced pressures to separate diamines formed by the dimerization of two monoamines from the new triamines. Crystalline amino derivatives can be produced and separated by fractional crystallization.

The new triamines obtained by the process of this invention are high boiling liquids. They are relatively stable by virtue of the fact that the primary amino groups are attached to tertiary carbon. The primary amines are useful for a wide variety of purposes such as bases, reaction with fatty acids to form emulsifying agents, removal of carbon dioxide from inert gases, acid gas absorbents, rubber accelerators and inhibitors. Since there is a plurality of primary amino groups in each molecule, the triamines react to form polymers and particularly crosslinked polymers, e.g., with formaldehyde or with dibasic acids such as adipic acid under the conditions customarily employed in the preparation of polyamides. In small quantities these triamines serve as viscosity control agents when employed in polyamide preparation.

The new triamines are superior to previously available triamines in that they can be prepared more readily. They are unique in their application as a curing agent for epoxy resins. For example, epoxy coating formulations were prepared by dissolving an epoxy resin ("Epon") in a solvent system containing methyl isobutyl ketone, xylene, n-butanol and cyclohexanol. With the triamine of Example I (2,5,8-trimethylnonane-2,5,8-triamine) as a curing agent, the epoxy resin had a satisfactory shelf life and cured the resin to give a higher solvent resistance for the coatings than given by conventional diamines. Castings of such a resin were generally superior in resistance to corrosion by acids and solvents and had a higher heat distortion temperature than otherwise given.

Since many different embodiments of the invention may be made without departing from the spirit and scope thereof, it is to be understood that the invention is not limited by the specific illustrations except to the extent defined in the following claims.

I claim:

1. In a process for the production of polyfunctional compounds by reacting hydroxyl free-radicals in an aqueous solution with an organic compound having no more than one cyclic group and that carbocyclic, soluble in water to the extent of at least 0.1% and which consists of hydrogen, from 2 to 12 carbon atoms and from one to two functional groups selected from the class consisting of cyano, carboxyl, carbonamide, carbonyl, amino and hydroxyl groups where any carbon-to-carbon unsaturation is solely in an aromatic group, the improvement of generating the hydroxyl free-radicals in the presence of said organic compound at a temperature in the range from $-10°$ to $100°$ C. in an aqueous solution having a pH less than 7.0 and containing 1 to 100 times as much water by weight as organic compound by reacting hydrogen in the presence of hydrogen and a noble metal hydrogenation catalyst with an oxidizable metal ion selected from the group consisting of iron, vanadium and titanium in said solution in a molar ratio of hydrogen peroxide to oxidizable metal ion in the range of 100:1 to 5:1.

2. The process as defined in claim 1 wherein said organic compound is a substituted aromatic hydrocarbon having a single aforesaid functional group.

3. In a process for the production of polyfunctional compounds by reacting hydroxyl free-radicals in an aqueous solution with a water-soluble aliphatic compound having at least 2 and not more than 12 carbon atoms, being free from carbon-to-carbon unsaturation, and having as its only substituent(s) at least one but not more than two functional groups selected from the class consisting of cyano, carboxyl, carbonamide, carbonyl, amino and hydroxyl groups, the improvement of generating the hydroxyl free-radicals in the presence of said aliphatic compound at a temperature in the range from $-10°$ to $100°$ C., in an aqueous solution having a pH less than 7.0 and containing 1 to 100 times as much water by weight as aliphatic compound by reacting hydrogen peroxide in the presence of hydrogen and a noble metal hydrogenation catalyst with an oxidizable metal ion selected from the group consisting of iron, vanadium and titanium in said solution in a molar ratio of hydrogen peroxide to oxidizable metal ion in the range of 100:1 to 5:1.

4. In a process for the production of polyfunctional compounds by reacting hydroxyl free-radicals in an aqueous solution with a polymerizable diene consisting of four to five carbon atoms and atoms selected from the group consisting of hydrogen and no more than four halogen atoms selected from the group consisting of fluorine and chlorine and a water-soluble aliphatic compound having at least 2 and not more than 12 carbon atoms, being free from carbon-to-carbon unsaturation, and having as its only substituent(s) at least one but not more than two functional groups selected from the class consisting of cyano, carboxyl, carbonamide, carbonyl, amino and hydroxyl groups, the improvement of generating the hydroxyl free-radicals in the presence of said aliphatic compound at a temperature in the range from $-10°$ to $100°$ C., in an aqueous solution having a pH less than 7.0 and containing 1 to 100 times as much water by weight as aliphatic compound by reacting hydrogen peroxide in the presence of hydrogen and a noble metal hydrogenation catalyst with an oxidizable metal ion selected from the group consisting of iron, vanadium and titanium in said solution in a molar ratio of hydrogen peroxide to oxidizable metal ion in the range of 100:1 to 5:1.

5. In a process for the production of polyfunctional compounds by reacting hydroxyl free-radicals in an aqueous solution with an aliphatic compound free from carbon-to-carbon unsaturation and having as its only substituent an amino group, the improvement of generating the hydroxyl free-radicals in the presence of, as said aliphatic compound, a primary monoamine having the amino group attached to tertiary carbon of an alkyl radical of 4 to 8 carbon atoms at a temperature in the range from $-10°$ to $100°$ C., in an aqueous solution having a pH less than 7.0 and containing 1 to 100 times as much water by weight as monoamine by reacting hydrogen peroxide in the presence of hydrogen and a noble metal hydrogenation catalyst with an oxidizable metal ion selected from the group consisting of iron, vanadium and titanium in said solution in a molar ratio of hydrogen peroxide to oxidizable metal ion in the range of 100:1 to 5:1.

6. The process as defined in claim 3 wherein said oxidizable metal ion is ferrous ion.

7. The process as defined in claim 3 wherein said oxidizable metal ion is vanadous ion.

8. The process as defined in claim 4 wherein the molar ratio of said diene to said hydroxyl free-radicals is between 1:1.5 and 5:1.

9. Triprimary triamino-substituted saturated aliphatic hydrocarbons of 12 to 24 carbon atoms having each of said primary amino groups attached to a tertiary carbon which is in turn removed from the nearest similar tertiary carbon by a chain of at least two carbons but not more than ten carbons.

10. Alkanetriamines selected from the group consisting of

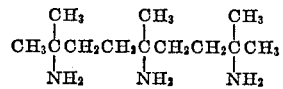

and

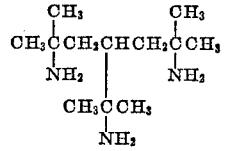

11. Triprimary triamino-substituted saturated aliphatic hydrocarbons of 15 carbon atoms having each of said primary amino groups attached to a tertiary carbon which is in turn removed from the nearest similar tertiary carbon by a chain of at least two carbons but not more than four carbons.

References Cited in the file of this patent

UNITED STATES PATENTS

| | | |
|---|---|---|
| 2,700,051 | Jenner | Jan. 18, 1955 |
| 2,765,306 | England | Oct. 2, 1956 |